Dec. 20, 1966   R. R. LUTHER   3,292,955
ADJUSTABLE PRESSURE LINE COUPLING
Filed Feb. 17, 1964

INVENTOR:
ROGER R. LUTHER
BY Marshall, Johnston,
Cook & Root
ATT'YS

United States Patent Office

3,292,955
Patented Dec. 20, 1966

3,292,955
ADJUSTABLE PRESSURE LINE COUPLING
Roger R. Luther, Zion, Ill., assignor to Anchor Coupling Co. Inc., Libertyville, Ill., a corporation of Illinois
Filed Feb. 17, 1964, Ser. No. 345,371
3 Claims. (Cl. 285—261)

This invention, in general, pertains to structures for coupling of two fluid-conducting members, and, more particularly, pertains to improvements in coupling structures in which a tubular member is coupled on another member with a fluid-tight, pivot joint therebetween.

The couplings of this invention utilize a tubular member with a spherical head seated in a matingly frusto-spherical seat of a base member to which said tubular member is coupled. The spherical seat communicates with a fluid-conducting passage in said member. The spherical head is held on said member by a retaining ring having a frusto-spherical seat matingly seated on said spherical head, and, by virtue of the special structure of the coupling, the frusto-spherical seat of the retaining ring and the frusto-spherical seat of the member combine to hold the spherical head when the ring is pressed toward the seat by a flanged clamp bolted or otherwise securely attached to said member. As a result of the improved coupling structures of the invention, a split flange connector can be used to secure the fitting on said member, especially a split flange connector having the characteristics outlined hereafter.

It is, therefore, a primary object of the invention to provide improved clamp structures for coupling a pressure line to a member having a fluid passage communicating with said pressure line. Another object is to provide clamp structures which facilitate the use of split flange connectors thereon. Still another object is to provide clamp structures utilizing a retaining ring designed to withstand hoop stresses of fluid pressure and to transmit pressure parallel to the axis of said ring and thereby load a split flange connector only in that direction. Another object is to provide fluid-tight unions embodying a hose fitting with a spherical head and associated clamp means embodying a split flange connector. Another important object is to provide fluid-tight union structures wherein the effective pressure end thrust area on the fitting is minimized to provide a minimized end thrust force on the connector structure clamping said fitting in mating relationship on a member having a passage communicating with said fitting.

The foregoing and numerous other important objects, advantages, and inherent functions of the invention will become apparent as the same is more fully understood from the following description, which, taken in connection with the accompanying drawings, discloses a preferred embodimet of the invention.

Figure 1:
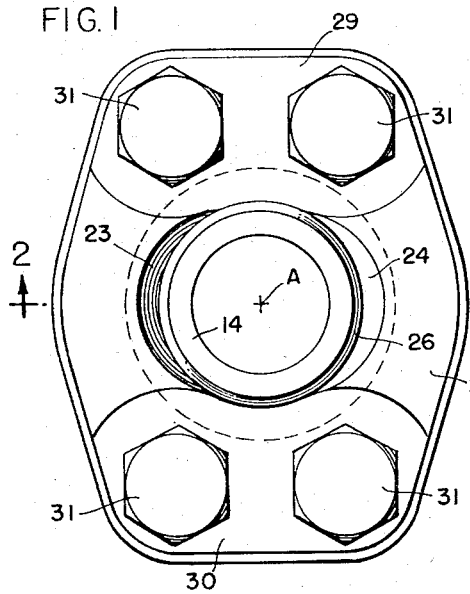
FIG. 1 is a top plan view of a clamp structure shown and described for purposes of explaining the advantages and structural improvements afforded by the preferred embodiment of the invention.
Figure 3:
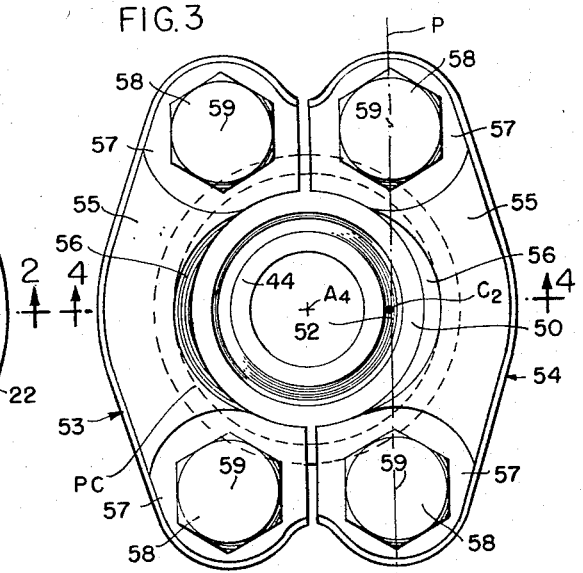
FIG. 3 is a top plan view of the preferred embodiment of the invention.
Figure 2:
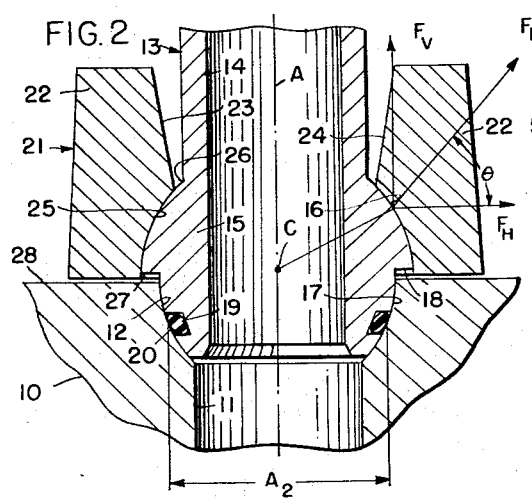
FIG. 2 is a sectional view taken on the plane 2—2 of FIG. 1.
Figure 4:
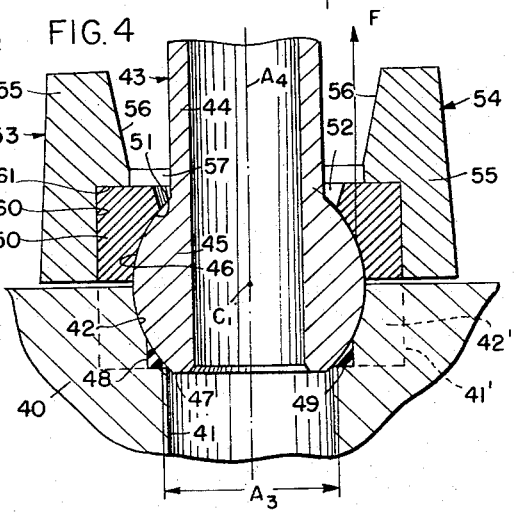
FIG. 4 is a sectional view taken on plane 4—4 of FIG. 3.
Figure 5:
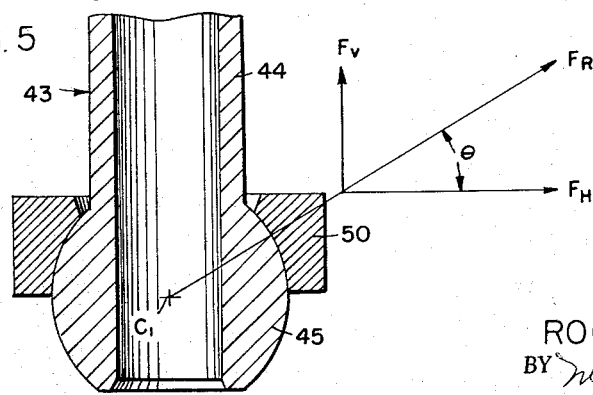
FIG. 5 is a sectional view similar to FIG. 4 of the spherical head fitting and retaining ring.

Referring to the drawings, FIGS. 1 and 2 show a coupling structure which preceded the preferred embodiment of the invention illustrated in FIGS. 3–5. The showing in FIGS. 1 and 2 is made primarily to provide better appreciation for the improvements disclosed in FIGS. 3–5.

Referring to FIGS. 1 and 2, there is shown a base member 10 having a fluid passage 11 therein. The base member 10 may be a part of a machine, or it may be a fitting, coupling, or the like. The fluid passage 11 communicates with a coaxially positioned, frusto-spherical seat 12 provided as a seat for a fitting 13 adapted to be coupled to the base member 10.

The fitting 13 comprises a tubular portion 14. It has an enlarged head portion 15 at the end thereof forming a frusto-spherical outer face 16 and a frusto-spherical outer face 17 joined by a ring-shaped lip 18. The spherical faces 16 and 17 have a common radial center C and the face 17 has a radius smaller than the face 16.

The face 17 has near the lower end but upwardly spaced therefrom a ring groove 19 in which is seated an O-ring 20 providing a fluid seal between the frusto-spherical faces 12 and 17 of the base member 10 and the fitting 13, respectively.

The effective end thrust area of fluid pressure against the lower end of the fitting 13 is the area defined by the sealing contact points of O-ring 20 on the face 12. This area is designated $A_2$ in FIG. 2.

The faces 12 and 17 are held in seated relationship against this end thrust by means of a solid, one-piece clamp member or flange 21. The clamp member 21 comprises a pair of opposed, upstanding, substantially rigid segments 22 which have opposing, arcuate, outwardly-flaring, recessed faces 23 and 24. The lower, inner segment of the members 22 has frusto-spherical face 25 of substantially equal radius with the face 16 and matingly seated thereon. A small annular clearance 26 is provided between the tubular wall 14 and the upper, annular corner of the face 25. A similar small clearance 27 is provided between the lip 18 and the outer face of the member 10 around the frusto-spherical recess 12. These clearances allow fitting 13 to be pivoted somewhat but prevent pivoting to such a degree that O-ring 20 would no longer be seated on face 12.

The fitting 13 and its coupling structure thus is designed so that the fitting 13 can be pivoted about center C and/or rotated about its longitudinal axis A, if desired.

The clamp member 21 is symmetrical and has at opposing ends thereof ears or flanges 29 and 30. These ears or flanges are provided with suitably sized holes through which extend shanks of bolts 31 which, in turn, are threaded into appropriately positioned and tapped holes in the base member 10 (not shown) to tightly lock the clamping member 21 on the base member 10. The centers of the bolts 31 preferably are positioned equidistant from the longitudinal axis A of the clamp member 21. It is essential in this embodiment to employ a solid or one-piece clamp member 21 inasmuch as the clamp structure 21 must resist a fluid pressure thrust force having an outward force vector $F_H$ and a vertical force vector $F_V$. If a split clamp were used, the outward thrust force $F_H$, which acts in all radial directions from the axis A, would cause outward pressures or forces in opposite directions against the segments of the split clamp and thereby cause the latter to spread slightly and destroy the fluid seal between faces 12 and 17. The one-piece clamp 21, on the other hand, does not have this inherent problem inasmuch as the rigidity of the clamp resists the opposing outward forces.

The resultant force vector $F_R$ of the vertical and horizontal thrust forces is shown in FIG. 2. This thrust force forms the angle $\theta$ between it and the horizontal vector. The embodiment of FIGS. 1 and 2 suffers an additional disadvantage in that the angle $\theta$ is subject to variation in the event the fitting 13 should be tilted with respect to the position shown in FIG. 2. This will be appreciated by the fact that the tilting, for example to the right from the position shown in FIG. 2, results in a displacement of the end thrust force boundaries of the thrust force area $A_2$ with respect to the center line or axis A. In such instances, the right hand thrust boundary of the thrust area $A_2$ gets closer to the center line or axis A, while the left hand boundary moves farther away. This results in a left hand displacement of the center of thrust of the fluid pressure from passage 11 against the end of the fitting 13 plus a change in the angle $\theta$ and an unbalancing of the thrust forces exerted against the face 25 by the face 16. While such unbalancing can be successfully compensated by a one-piece clamp, such as is shown in FIGS. 1 and 2, it again makes unsuitable the use of a split clamp in this embodiment.

In the light of the above background, the improvements afforded by the preferred embodiment of FIGS. 3–5 will be better appreciated. In this preferred embodiment, there is shown a base member 40 of a similar nature to the base member 10. Base member 40 has a fluid passage 41 communicating with a frusto-spherical face 42 provided in the base member 40. If desired, as indicated in dotted lines at 41' in FIG. 4, the face 42 may be formed in a removable, preferably cylindrical, insert 42' adapted for reception in a corresponding seat formed in the base member. In either case, the face 42 forms a seat for a fitting 43 having a tubular portion 44 and an enlarged head 45.

The outer face 46 of the head 45 is preferably of frusto-spherical configuration having uniform radius from the center $C_1$. The face 46, however, may comprise two frusto-spherical portions of unlike radius, similar to the faces 16 and 17 of the FIG. 2 embodiment.

The head 45, at its lower end, may have a portion 47 extending below and inwardly of the juncture of the cylindrical wall of the passage 41 with the frusto-spherical face 46; and an annular groove or recess 48 for a suitable seal ring 49 may be formed at said juncture. The seal between the face 42 and the face 46 is thus formed substantially at the juncture of the cylindrical wall of the passage 41 and the face 46. This provides an effective end thrust area against the fitting 43 by fluid pressure in the passage 41 equal to or slightly larger than the area of the passage 41. This area is designated $A_3$ in FIG. 4, and constitutes a substantially smaller end thrust area as compared with the corresponding end thrust area $A_2$ in the FIG. 2 embodiment. The portion 47 of the frusto-spherical face 46 is provided so that the fitting can be tilted within limits in any direction relative to the base member 40 without losing the fluid seal between the face 46 and the seal ring 49; and it will be noted that the seal ring 4 not only seals the fluid leakage path between the faces 42 and 46, but also between the insert 42' and its seat 41', when the face 42 is formed in a removable insert.

The axial pressure thrust force exerted against the end of the fitting 43 is counteracted or resisted by providing an axial thrust transmitting ring 50 having a frusto-spherical face 51 of radius substantially equal to that of the face 46 upon which it bears, the arrow F, in FIG. 4, indicating the mean axial thrust forces applied, by the head 45, upon the thrust transmitting ring 50. A circular clearance space 52 is provided between the outer wall of the tubular portion 44 of fitting 43 and the upper end of the retaining ring so that the fitting can be tilted within limits without binding.

The axial thrust transmitting ring 50 is clamped against the face 46 to hold the faces 42 and 46 in tight, sealing relationship by means of a pair of opposing, symmetrical, split clamps 53 and 54. The split clamps 53 and 54 each comprise an upstanding, rigid, solid, center segment 55 having, in assembled relationship, opposed, outwardly-flaring, concave faces 56. The split clamps further comprise symmetrically positioned ears or flanges 57 at opposite ends of the upright members 55. These flanges have provided therein bolt holes spaced equidistant from the longitudinal axis $A_4$. Bolts 58, having their centers 59 equidistant from the axis $A_4$, are threaded into the base member 40 in suitably oriented, tapped holes (not shown) to hold each of the split clamp members 53 and 54 in tight, clamping engagement on the base member 40. The upright members 55 each have a recess in the lower, inner face thereof providing a semi-cylindrical wall 60 and an arcuate lip 61, which presses against the upper face of the thrust transmitting ring 50. The frusto-spherical face 51 of the ring 50, in turn, presses against the face 46 of the fitting 43 to hold the faces 42 and 46 in fluid-tight contact at the seal ring 49.

The fitting 43 is thus rotatable about its axis $A_4$ and can also be tilted within the limits of the clearance 52 about the center $C_1$. This gives the fitting excellent adaptability in making connections with rigid tubes or the like by allowing some latitude for misalignments, etc., of the parts to be bridged by the tube.

An additional advantage of the embodiment of FIGS. 4 and 5 is that the axial thrust transmitting ring 50 has sufficient tensile strength and rigidity so that the outward or horizontal force vector $F_H$ (FIG. 5) is taken up or resisted by the axial thrust transmitting ring 50 rather than by the clamp member or members. Additionally, the resultant force vector $F_R$ of the vertical vector $F_V$ and horizontal vector $F_H$ forms an angle $\theta$ between the vector $F_H$ and $F_R$ regardless of the orientation in terms of tilting of the fitting 43 relative to the base member 40. This is true because the thrust area $A_3$ remains constant relative to the longitudinal axis $A_4$ in any position of tilt. By virtue of the constant angle $\theta$ and the absorption or resistance of the force $F_H$ by the rigid axial thrust transmitting ring 50, the only force exerted on the split clamp members 53 and 54 is the vertical force $F_V$. Thus, the force $F_V$ constitutes the resultant force F (FIG. 4) exerted on the split clamp members. The forces F can be suitably restrained by split clamp members as long as the horizontal thrust vector against these members is essentially absent. The axes of the bolt holes of each clamp sector 53 and 54 extend in a plane P spaced from and parallel to the axis $A_4$ of the channel 41, which plane also contains the centroid $C_2$ defining the locus of the resultant of all distributed forces applied by the ring 50 upon the area of the lip of each sector that is engaged by the ring. The precise location of the centroid, for each clamp sector, may be determined by finding the position of the plane P such that equal areas of the semi-circular ring engaging face of the clamp lip 61 extend on opposite sides of the plane, the locus of the centroid being midway between the two places of intersection of the plane with the curved edge of the lip, that is to say, at the intersection of the plane P with the radius from the axis $A_4$ that is normal to the plane. A simplified method for locating the centroid $C_4$ is first to determine the position of the mean line of contact PC of the arcuate ring engaging surface of the lip 61, said mean line forming a semicircle disposed between the inner and outer edges of the lip, in position such that equal areas of the lip extend on opposite sides of the mean line PC. Thereafter, the plane P is located in such position that equal aggregate lengths of the semicircle line PC extend on opposite sides of the plane P, the centroid $C_4$ being disposed midway between the points of intersection of plane with the line PC.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose illustrating the invention.

The invention is hereby claimed as follows:

1. A coupling comprising components including a base member having a frusto-spherical seat and a fluid passage communicating with said seat, a tubular fitting formed with an axis passage and a head providing a spherical inner face portion matingly engaging said seat, a circumferentially continuous axial thrust transmitting ring embracing said fitting and having a flat top normal to its axis, on one side thereof, and a frusto-spherical portion, on its other side, facing toward said seat and matingly engaging a spherical outer face portion of said head, a pair of symmetrical split clamp sectors respectively engaging opposite sides of said thrust transmitting ring, each sector having a massive, rigid, semi-circular portion and a flange at each end thereof, each sector having a semi-cylindrical inner face, sized and configurated to embrace and enclose one-half of the periphery of the thrust transmitting ring, and an arcuate lip overhanging said inner face in position to clampingly engage the flat top of the ring at and inwardly of its said periphery, said ring being adapted to function in hoop tension by absorbing radial components of thrust applied thereon by said head, thereby applying only axial thrust upon the lips of said clamp sectors, and a bolt extending through each of said flanges and secured to said base member to clamp the coupling components together.

2. A coupling as set forth in claim 1, wherein the axes of the bolt holes of each clamp sector extend in a plane through the centroid of axial thrust forces applied between the arcuate lip of the sector and the area of the flat top of the thrust transmitting ring engaged thereby.

3. A coupling as set forth in claim 2, wherein the base member is formed with a circular groove at the junction of said fluid passage with said frusto-spherical seat, and a seal ring mounted in said groove in position bearing upon the spherical inner face portion of said head.

References Cited by the Examiner
UNITED STATES PATENTS

| 855,739 | 6/1907 | Wilcox | 285—271 |
| 908,414 | 12/1908 | Mellin | 285—271 |
| 1,266,061 | 5/1918 | Scoville | 285—261 |
| 2,564,938 | 8/1951 | Warren | 285—261 X |

FOREIGN PATENTS

| 211,047 | 9/1957 | Australia. |
| 989,013 | 5/1951 | France. |
| 490,763 | 2/1930 | Germany. |
| 282,482 | 2/1925 | Great Britain. |

THOMAS F. CALLAGHAN, *Primary Examiner.*

CARL W. TOMLIN, *Examiner.*

D. AROLA, *Assistant Examiner.*